United States Patent [19]

Robbins et al.

[11] 4,181,070

[45] Jan. 1, 1980

[54] METHOD OF MAKING VARIABLE PLEAT PAPER

[76] Inventors: Alvin M. Robbins, 6755 South 1495 East, Salt Lake City, Utah 84121; Paul J. Robbins, 3468 Casino Camino, Salt Lake City, Utah 84119

[21] Appl. No.: 768,986

[22] Filed: Feb. 16, 1977

[51] Int. Cl.² ............................................. B31D 5/04
[52] U.S. Cl. .................................... 93/60; 93/1 C
[58] Field of Search ......................... 29/163.5 F, 417; 93/1 H, 1 G, 60, 1 C; 264/286, 287

[56] References Cited

U.S. PATENT DOCUMENTS

| | | | |
|---|---|---|---|
| 2,550,070 | 4/1951 | Brecque et al. ................ 29/163.5 F |
| 2,553,054 | 5/1951 | Lincoln et al. ........................ 93/1 H |
| 2,670,314 | 2/1954 | Ungar ..................................... 93/1 H |
| 2,950,656 | 8/1960 | Gewiss .................................. 93/1 H |
| 4,012,932 | 3/1977 | Gewiss .................................. 93/1 H |

*Primary Examiner*—James F. Coan
*Attorney, Agent, or Firm*—Trask & Britt

[57] ABSTRACT

A variable pleat filter paper pleater with rotary scoring means is disclosed. A large roll of resin impregnated paper is passed through rotary scoring means to score the paper to facilitate folding (pleating). The paper is drawn past or through the rotary scoring means by drive rollers. The rotary scoring means rotational speed may be varied with respect to the drive rolls. The scored paper passes from the drive rolls into pleating means which causes the paper to form pleats. The pleated paper is passed through an oven to cure the paper. The cured or partially cured paper is placed in porous canisters. Lids are sealed on each end of the canister to form an air filter for vehicles.

7 Claims, 11 Drawing Figures

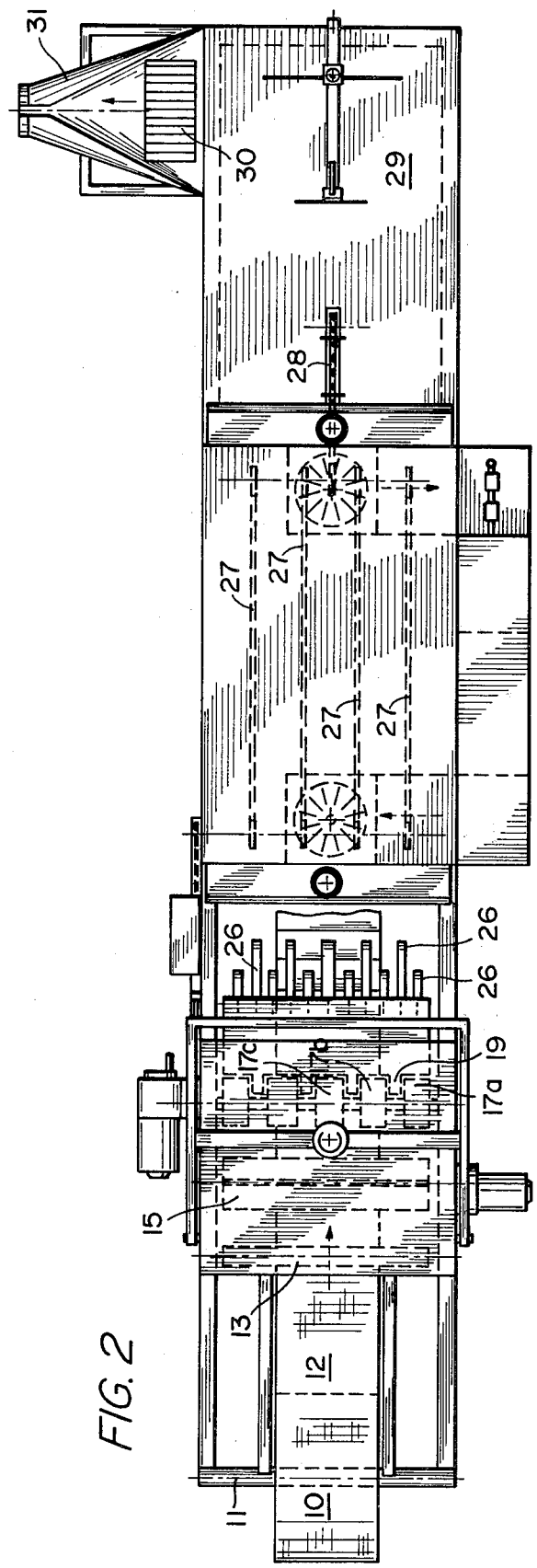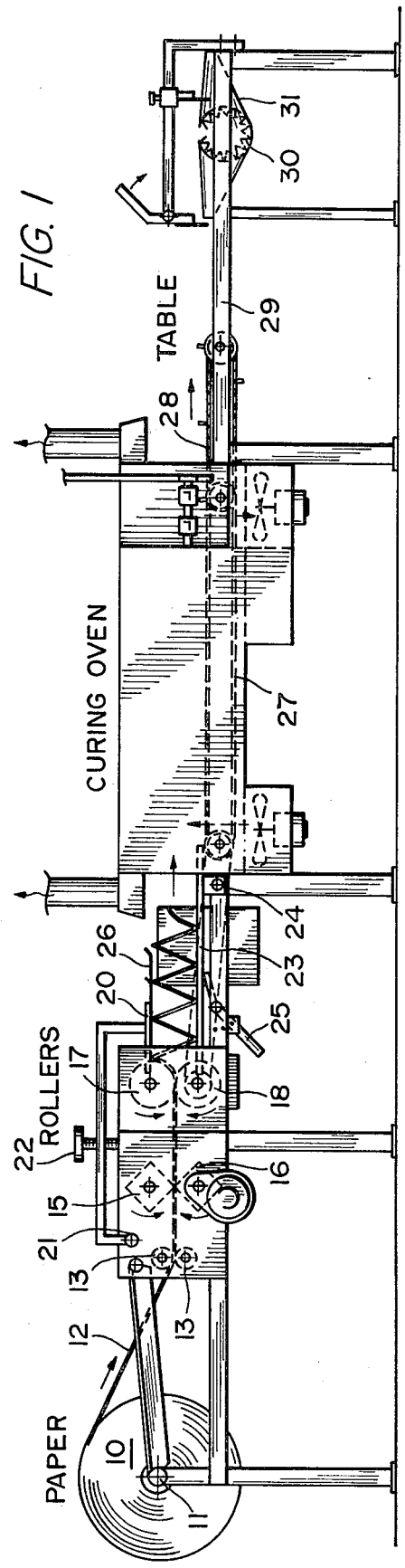

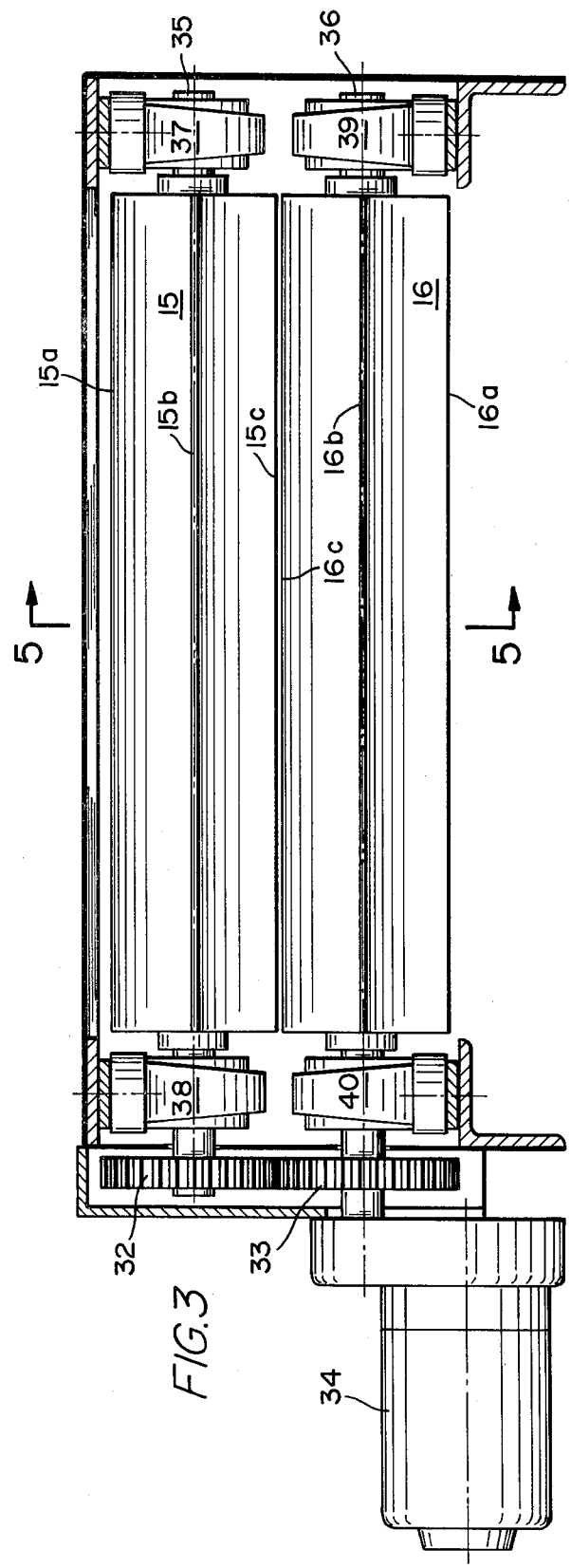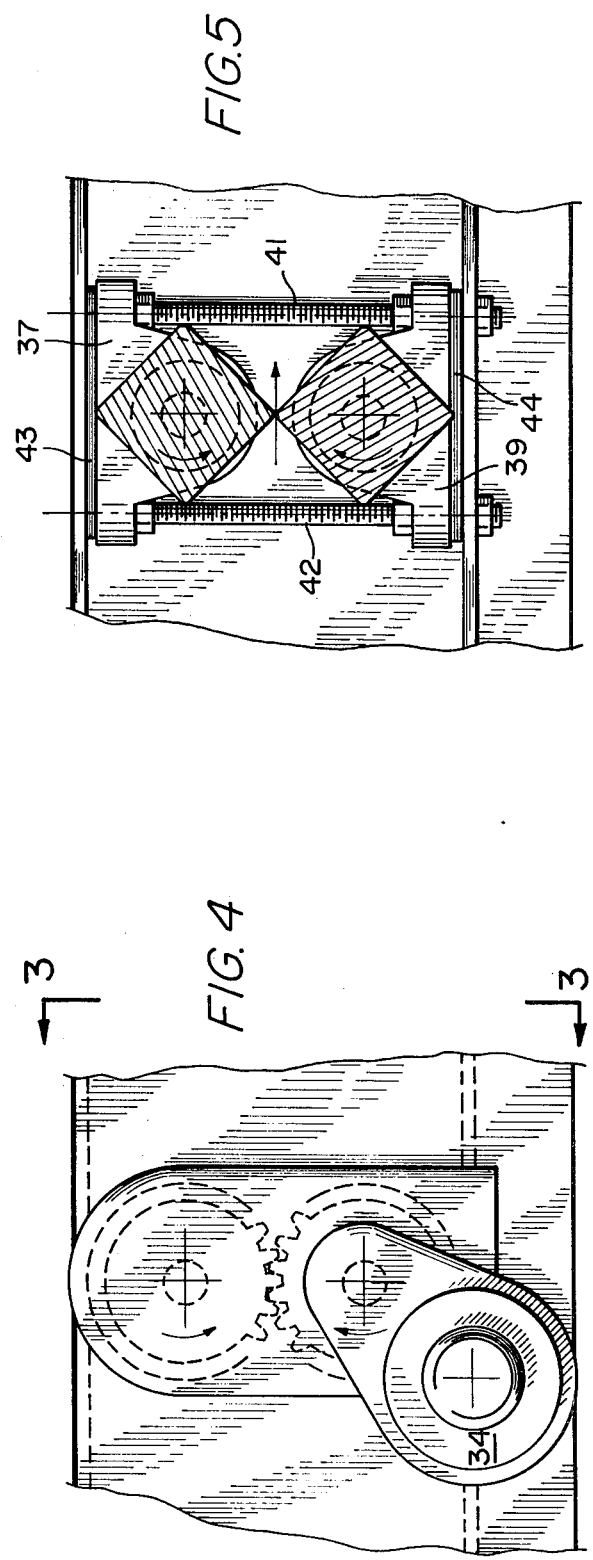

METHOD OF MAKING VARIABLE PLEAT PAPER

BACKGROUND OF INVENTION

1. Field:

This invention relates to apparatus and processes for pleating resin impregnated paper and to forming an air filter unit from said pleated paper. The air filters are utilized to filter air entering an internal combustion engine or other machines requiring filtered air.

Air filters, especially for large trucks and earth moving equipment, have a pleated paper insert in a cylindrical metal screen having metal beds on each end. The paper insert becomes dirty quickly, causing engine inefficiency. Replacing the whole filter is uneconomical. Cleaning of the paper in situ, is generally ineffective. Since the metal portions of the filter remains useful, it is more economical to dismantle the filter and replace the paper insert. One disadvantage of so doing by a small business prior to the instant invention was the necessity of having a separate pleating machine to make each size of the many paper inserts in use.

2. Prior Art:

Techniques for forming air filters from pleated paper are well known. Typical rotary pleating apparatus produce pleats of a fixed dimension. The pleated paper is then generally only partially cured so that it may be readily cut to a proper length, formed into a cylinder and placed in a canister. The canister containing partially cured paper is then heated in an oven to fully cure the paper. Fully cured paper is very springy and difficult to handle and place in a canister. Uncured paper in a filter fails to hold its form under use; the pleats collapse.

Although most filter pleating apparatus are limited to pleating paper with a fixed pleat width, some variable pleaters are understood to have been utilized. One type of variable pleater uses horizontal bars which may be regulated in relating to the linear velocity of the paper so that various width pleats may be produced.

Pleated filter paper has an accordion appearance. In typical prior art processes the paper is placed in canisters in an uncured or only partially cured condition because fully cured pleated paper is very springy, difficult to form into a cylinder and to place into a cylindrical canister. After paper is placed in the canister, the ends are capped and the whole filter unit heated to cure fully the paper and to cure the plastisol in the end caps. Such curing is often difficult to effect without scorching the outermost surfaces of the paper.

OBJECTS OF THE INVENTION

It is an object of the instant invention to provide an efficient variable pleat filter paper pleater.

Another object of the instant invention is to provide variable speed rotary scoring means for a variable pleat filter paper pleater.

A further object of the instant invention is to provide a simplified apparatus and process for pleating, curing and forming cylinders of resin impregnated filter paper.

DESCRIPTION OF DRAWINGS

FIG. 1 is an elevational view of the pleating, curing and filter forming apparatus;

FIG. 2 is a plan view of the pleating, curing and filter forming apparatus;

FIG. 3 is an elevational view of the scoring rollers and associated drive mechanism;

FIG. 4 is a sectional view along section lines 3—3 of FIG. 2;

FIG. 5 is a sectional view along section lines 4—4 of FIG. 2;

DESCRIPTION OF THE INVENTION

Figure 6:
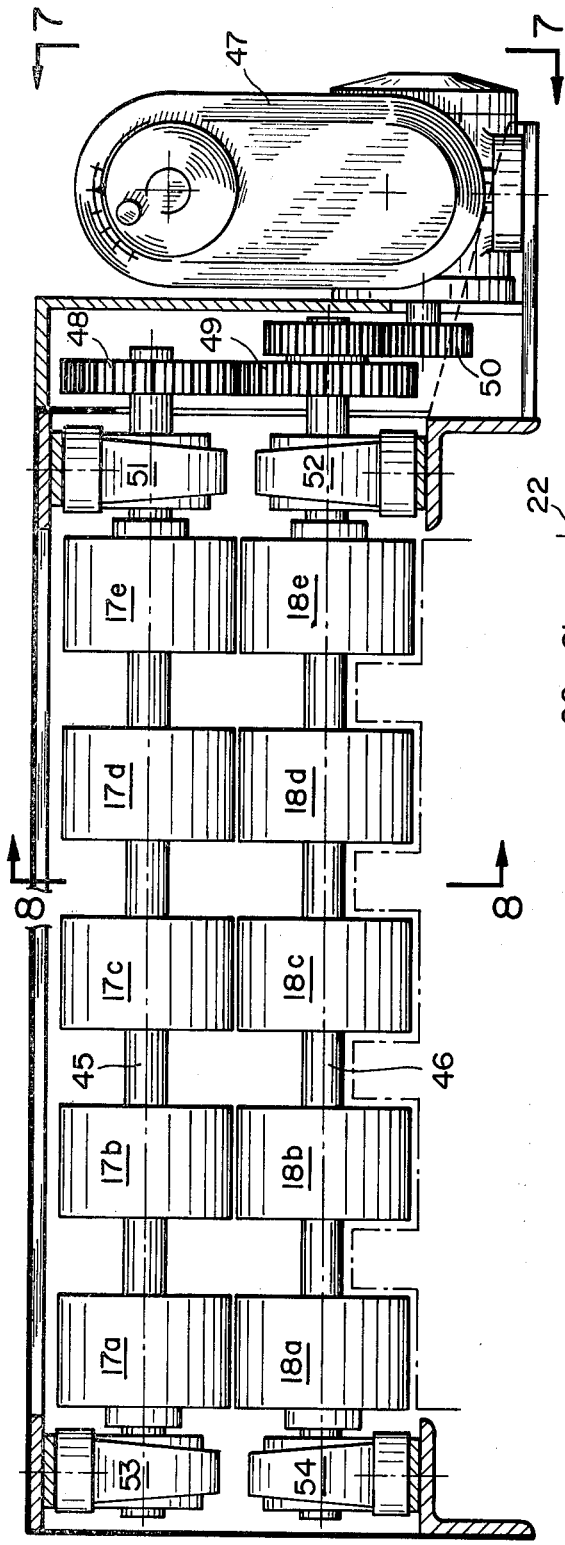
FIG. 6 is an elevational view of the drive rolls.

A variable pleat filter paper pleater with rotary scoring means has been invented. A large roll of resin impregnated paper is unrolled and the paper strip passed through rotary scoring means to score the paper, preferably on each side, to facilitate folding or pleating. The paper is drawn past or through the rotary scoring means by drive rollers, which are preferably segmented rollers placed on parallel shafts. The rotary scoring means has a rotational speed which preferably may be varied with respect to the rotational speed of the drive rolls. Typically the rotational speed of the rotary scoring means may be varied from a speed which matches that of the rotary drive means up to a speed which may be several times that of the rotary drive means.

Alternatively, the rotary scoring means may have a fixed rotational speed, with the drive rolls having a variable speed ranging from a rotational speed equal to the scoring rolls to a speed only a fraction thereof.

The scored sheet of paper passes from the drive rolls into pleating means which are preferably vertically spaced parallel plates which cause the paper to fold or pleat. The paper tends to follow one or the other rollers as it exits from the rollers, thereby moving to strike either the lower or upper plate to fold or form an open pleat. The segmented rolls have fixed fingers between roll segments to prevent the paper from winding around a roll. The pleated paper is then passed continuously through an oven to at least partially cure the paper. The cured or partially cured paper is placed in porous canisters. Lids are sealed on each end of the canisters to form an air filter for vehicles utilizing internal combustion engines. In the event the paper is only partially cured, the air filter unit is placed in an oven to complete the curing of the paper.

It is generally preferable to cure fully the paper before placing it in a canister since it can be cured in a substantially unfolded condition. In the canister in a folded condition the paper acts as an insulator causing difficulties in curing the innermost pleats of the paper without scorching the outermost surfaces of the paper.

The paper is resin impregnated and cured to enable the paper to withstand the forces applied to the paper during its use in an air filter. Further, the resin impregnation permits the paper when fully cured to be springy so that the pleats are not closed by air blowing through them and so the filter is not collapsed by the impact of air. It is necessary for the filter to maintain an open pleat in order for the filter to do an efficient job.

The technique of the invention is particularly unique inasmuch as one machine or apparatus may form filter paper having pleats from about one inch to about three inches in width or more and preferably from about 1½ inch to about 2½ inches. The production of pleated filter paper having various width pleats is particularly important for small shops where the cost of having more than one pleating machine is prohibitive. Also, the technique of this invention is unique inasmuch as the filter paper is cured continuously as the open pleated paper is passed through an oven. The resulting pleated strip of paper is springy and difficult to insert in a canister. The instant invention provides mechanical guide means so that fully cured paper may be handled and may be readily inserted into a filter. This offers a significant advantage inasmuch as curing the filter paper after it has been placed in a canister requires more time and energy inasmuch as the filter paper, which is a good insulator, is tightly packed. Also, curing the paper after it is placed in the canister offers substantial likelihood that some of the paper will be scorched and therefore lose its strength.

Further understanding of the invention may be facilitated by reference to the attached drawings. FIGS. 1 and 2 illustrate a complete apparatus for scoring, moving and curing a continuous strip of resin impregnated paper. Thereafter the pleated strip of paper is cut to appropriate lengths and mechanically formed into a cylinder for insertion into a canister for use as an air filter. A large roll of impregnated paper 10 is carried on a shaft 11 at one end of the variable pleating and curing apparatus. The paper 12 passes between a pair of guide rollers 13 and 14 and then between a pair of scoring elements 15 and 16. The paper is pulled by a pair of drive rollers 17 and 18 which are driven at a constant speed. The drive rollers 17 and 18 are preferably segmented rolls disposed on a pair of parallel shafts. The segmented rolls 17a, 17b, 17c and the like are spaced a sufficient distance that a finger 19 from the upper tensioning plate 20 may project between each pair of segmented roller elements. In this fashion, as illustrated in FIG. 1, as the paper passes through the drive rolls it will tend to follow one of the rolls, moving upward or downward depending upon which roll it follows. Whenever the paper meets the tensioning finger 20 it will buckle so that the next pleat will follow the other roll until it meets a tensioning finger projecting between adjacent rolls of the tensioning finger of the bottom plate which projects between adjacent rolls.

The upper tensioning plate 20 is hinged at pin 21 and the vertical adjustment of tensioning plate 20 is adjusted by an adjustment screw 22. The bottom plate 23 is hinged at pin 24 and the spacing adjustment is adjusted by lever 25 wherein pins hold lever 25 in various positions. Tensioning plates 23 and 20 are always maintained in a substantially parallel relationship although the plates may not be necessarily horizontal.

Whenever small pleats are made then tensioning plates 20 and 23 are moved closer together. The spring-like strips 26 extending from tensioning plate 20 place some resistance on the folds for pleats so that the pleat is maintained at about the desired angle as it passes into the curing oven. It is preferred that the pleats have an open angle of about 45° to about 90° and preferably from about 45° to about 60° as the pleated paper passes through the curing oven. If the pleats are tighter than about 30° included angle the air does not circulate well through the paper and the paper tends to undercure or to cure unevenly. If the pleats are more open than an included angle of about 90° then the paper moves too quickly through the oven and a longer oven is required to achieve the same cure. Also, it is desired that the cured paper has an angle of about 45° to about 60° inasmuch as this establishes a permanent set in the paper, and while the cured paper is quite springy it will tend to assume an included pleat angle of 45° to 60° when allowed to assume a natural position. Whenever the paper is inserted in a canister the pleats are very tight, with an included angle of perhaps about 10° to 30°. Since the pleat has a memory of a larger angle the pleat tends to stand open at 10° to 30° and is difficult to collapse by the air rushing through it.

The pleated continuous strip of paper passes into the oven and is conveyed through the oven on narrow conveyor chains 27 so that the paper is open to the hot air circulating in the oven. The oven is generally maintained at a temperature of about 400° F. for typical resin impregnated filter paper. With a pleat opening of about 45° to 60° a residence time of about 36 seconds in the oven is proper for a typical resin impregnated filter paper.

A typical filter paper is one made by Hollingsworth and Vose Company under specification 20-6-7 which cures at 400° F. in about 30 seconds. Typical commercial grade filter papers are resin impregnated cotton linear fibers wherein the resin changes color after curing so that the correct degree of cure can be noted. The uncured resin impregnated paper is a light greenish grey while in the cured state it has a straw yellow or tan appearance. Overcuring is detected by a scorched appearance while undercuring is detected by the presence of a slight greenish grey appearance. Also, at the proper cure the pleated paper has a springy or elastic quality with a memory of the pleat angle at which it was cured. Undercured paper does not have as much elasticity and overcured paper tends to be too rigid and easily destroyed.

The conveyors 27 are thin chain conveyors which support any width of continuous strip of pleated paper conveyed through the oven. At the discharge end of the oven the paper is supported by a flat table or tray with a small conveyor 28 having spaced flights thereon to move the paper away from the discharge of the furnance and down the tray or table 29. On the tray or table 29 the paper is cut into preferred lengths. The length may be determined prior to the time the paper is scored through use of a marking apparatus wich places a mark on the paper at a predetermined distance. The pleated paper is then cut on the marks. In this manner the length of paper which is made into a cylinder has the exact length and has a desired pleat angle for a particular filter. After the paper is cut the length of pleated paper 30 is placed into the fluted chute 31 so that the paper forms a contained cylinder. The fluted or convoluted chute has a significant function in forming a linear section of pleated paper into a hollow cylinder so that it may be inserted into a canister without the pleated paper springing apart.

The drive roll 17 is typically run at 18 revolutions per minute for drive rolls which are about 4 inches in diameter. The speed, of course, is preferably a fixed value for any given apparatus. However, rolls of a different size may be used to produce a different linear speed for the paper pasing through the drive rolls. When four inch drive rolls are used, the scoring rolls also have a 4 inch diagonal thickness and are typically rotated from about 18 rpm to about 108 rpm. As the scoring rolls run faster than the drive rolls, the scored lines on the paper are closer together than the width of the face of the bar between the scoring edges.

The drive rolls may be selected from a wide range of values. However, as indicated herein, the rotational speed of the drive rolls is preferably fixed for a given machine.

The scoring rolls are illustrated in detail in FIGS. 3, 4 and 5. The scoring rolls illustrated in the instant invention are four sided bars having four scoring edges such as edges 15a, 15b, 16a, 16b, 15, 16c with the remaining edge not shown. The scoring bars must be precisely machined so that when the scoring edges are in proximity and vertically aligned with one another the distance between the opposed scoring edges is substantially uniform the entire length of the scoring means. The scoring edges of opposed scoring rolls preferably do not contact one another when they are adjacent and vertically aligned. Typically, the spacing between adjacent edges of opposed rolls when in a scoring position is about two-thousandths to about fifteen-thousandths depending upon the thickness of the paper. Most commercial grade filter papers are about 0.02 inches in thickness, however, the thickness may vary from 0.01 inches to about 0.03 inches in thickness.

In FIG. 3 edges 15c and 16c are shown in a scoring position. Each opposed edge must be parallel to one another and the edges must be straight and uniform so that the paper passing between the rolls is uniformly scored, that is, uniformly impressed on each side. At the lowest rotational speed the rolls score the paper once approximately every three inches which is the width of a face of the scoring bar. As illustrated in FIG. 3 the bars are rotated together in opposite directions in the presence of gears 32 and 33. Gear 33 is driven by a variable drive gear motor 34.

The scoring rolls are supported on axles 35 and 36 with the axles being secured in pillow blocks are each end. The pillow blocks 37 and 38 support the upper axle while the pillow blocks 39 and 40 support the lower axle. The pillow blocks may be adjusted as shown in FIG. 5 so that the edges of the scoring bars are disposed in a parallel relationship when in a scoring position. In FIG. 5 the elongated bolts 41 and 42 hold the pillow blocks 37 and 39 in a fixed relationship to one another. Shims 43 and 44 may be utilized to regulate the exact spacing between the scoring edges of the opposed rolls or bars.

The drive rollers are illustrated in FIG. 6 in an elevational view. The spacing between the individual segments of each drive roller, such as 17a, 17b, 17c, etc., 18a, 18b, 18c, etc. is illustrated on FIG. 6. The spacing between the roll segments is preferably about one-third to approximately equal the width of the individual roll segments. In between the rolls segments of the upper roll, fingers protrude towards the axle 45 from the upper tensioning plate 20 while the lower axle 46 has fingers protruding therein from the lower tensioning plate 23. As previously indicated, these fingers prevent the paper from wrapping around either roll as its exits from the drive rolls.

The drive mechanism 47 for the drive rolls may be a constant speed motor interconnecting with drive gears 48 and 49 through a gear train mechanism 50 to drive the drive rolls at a constant speed. Although the drive rolls could be driven at a variable speed with the scoring rolls driven at a constant speed, this is generally not preferred inasmuch as the paper velocity through the oven is preferred to remain constant so that a standard oven length may be constructed. A particular oven length is proper for curing a given paper at a proper cure temperature for a given velocity of paper through the oven.

As indicated, merely for pleating purposes, the scoring rolls could be driven at a constant speed with the drive rolls operated at a variable speed. In practice, however, it is generally desired to run the drive rolls at a constant speed inasmuch as the paper handles much better at lower rpm (lower linear velocity) than it does for high rpm. For example, if the paper were driven at a velocity of 108 rpm for a four inch diameter roll, i.e., a linear velocity of approximately 108 feet per minute, a considerable problem occurs with the paper tracking unevenly, becoming crumpled and other difficulties attendant to a high linear velocity. Thus, while it is feasible to drive the scoring rolls at a variable rpm and even to drive them at high rpm, the preferred practice for this invention is to drive the scoring rolls at a variable rpm with the drive rolls being driven at a constant rpm to give a paper velocity in the neighborhood of about 5 feet per minute to about 30 feet per minute and preferably from about 10 feet per minute to about 25 feet per minute. It is to be understood, of course, that the scoring rolls may be run at various speeds, but the speed is set for production of pleated paper with a certain size pleat.

It is necessary to maintain the drive rolls 17 and 18 at a uniform spacing throughout the whole roll with the rolls being spaced apart a distance slightly less than the thickness of the paper being handled. For example, if the paper has a thickness of 0.02 inches the setting of the rolls is adjusted so that the rolls are spaced apart about 0.15 inches to about 0.18 inches. Generally, the spacing between the rolls is about 40% to about 80% the thickness of the paper. The individual roll segments 17a, 17i b, etc. must be carefully machined so that there is a uniform spacing between each roll segment, otherwise the paper will not feed uniformly through the rolls and will not track properly through the apparatus. The spacing between rolls may be adjusted as illustrated in FIGS. 6 and 8 wherein the pillow blocks 51 and 53 of supporting axle 45 and 52 and 54 supporting axle 46 may be adjusted vertically by means of the bolts 55 and 56 at one end and similar bolts at the other end of each pair axles.

Shims 57 and 58 may be utilized to adjust the spacing between the rolls with the bolts 55 and 56 then being used to tighten pillow blocks against the particular shims used. Alternate means of adjusting spacing, of course, may be utilized wherein bolts or nuts may be placed on each side of the pillow blocks on the bolts so that the mechanism may be adjusted without the use of shims.

Figure 8:
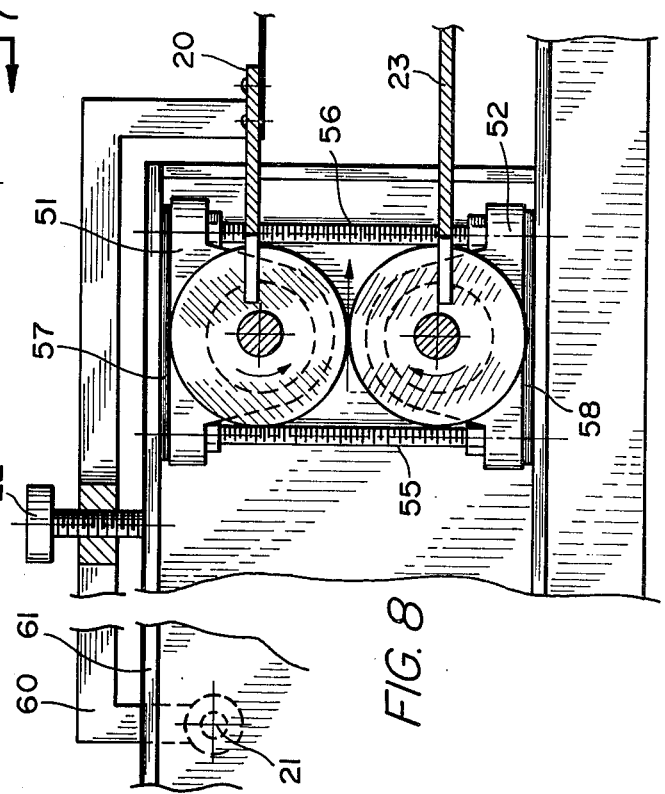
FIG. 8 is a sectional view along section lines 8—8 of FIG. 6.
Figure 7:
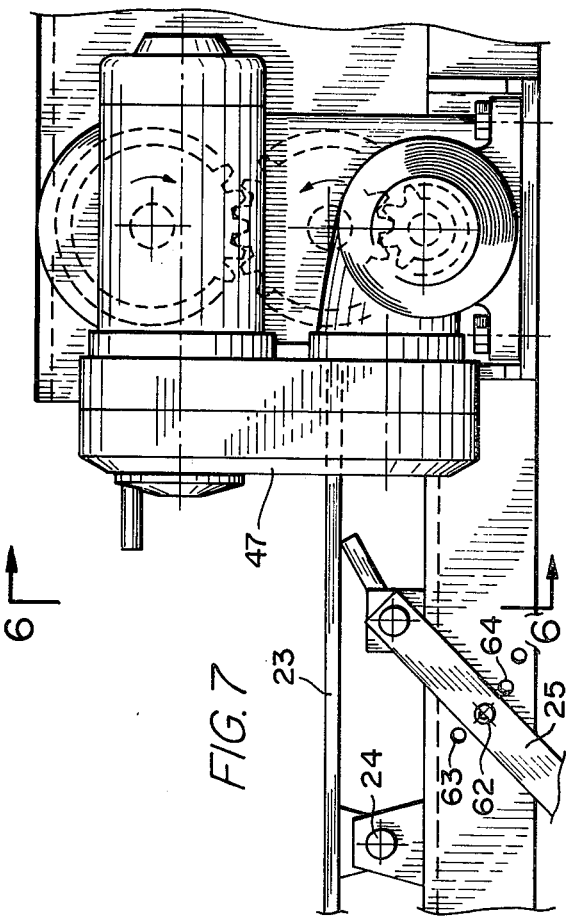
FIG. 7 is a sectional view along section lines 7—7 of FIG. 6.

In FIGS. 7 and 8 the adjustment mechanism for adjusting the spacing between the tensioning plates, that is the upper plate 20, and the lower plate 23, is illustrated. The upper tensioning plate 20 is hinged to pin 59 and has a lever plate 60 extends to the pin and is held in position by an adjusting mechanism which is an adjustment screw 22 which passes through the lever mechanism 60 and butts against a top plate of the apparatus 61 which covers the scoring and drive rolls. Adjusting thumb screw or adjustment screw 22 pivots the plate 20 about pin 21 so that it always is maintained parallel to the bottom plates 23 which is adjusted by lever 25 which is adjusted by means of the pin 62 being inserted in various holes 63, 64, etc.

Figure 9:
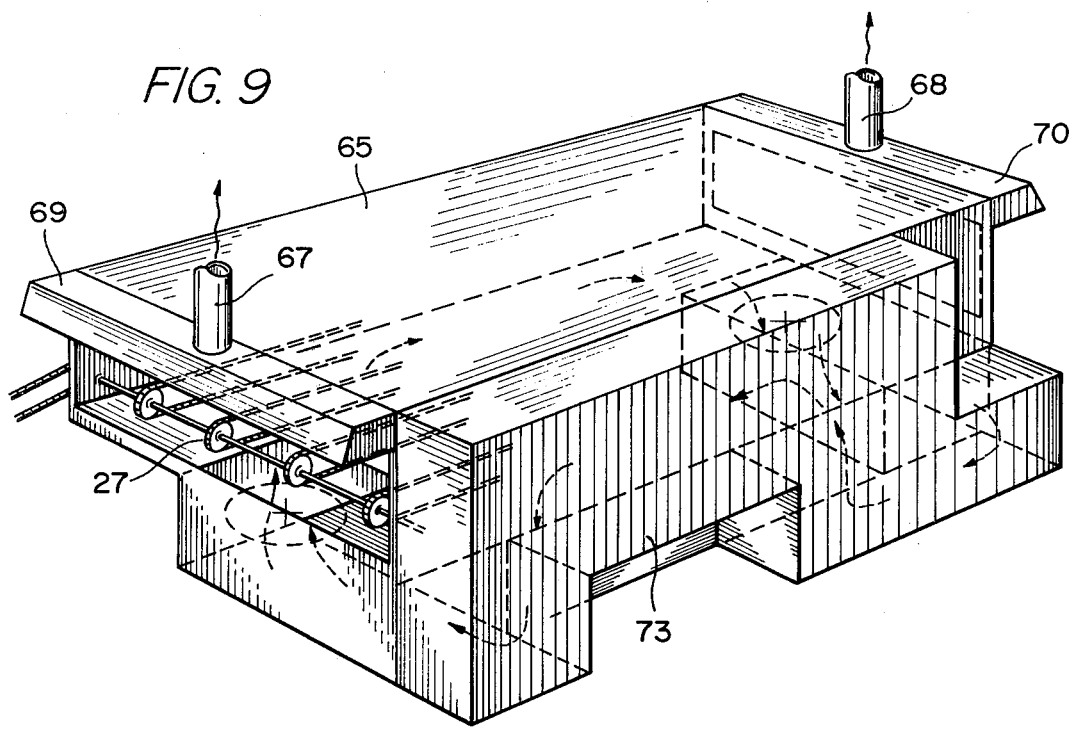
FIG. 9 is a perspective view of the curing oven.
Figure 10:
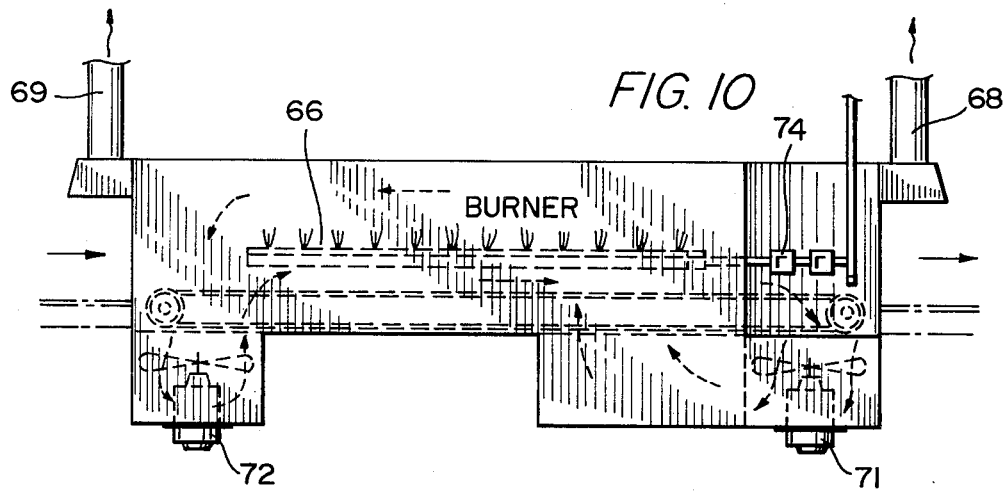
FIG. 10 is a sectional view of the hot box heater for air circulating to the oven.
Figure 11:
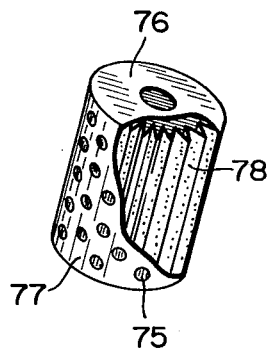
FIG. 11 is a perspective view of a rebuilt air filter.

The continuous curing oven is illustrated in FIGS. 9, 10 and 11. The particular configuration illustrated is especially effective for curing a continuous strip of resin impregnated pleated paper.

In the oven 65 parallel chain or thin belt conveyors 27 move the continuous pleated strip of paper from one end of the oven to the other. The hot air flow preferably passes up through and around the pleated paper strips at the inlet of the oven and then flows in the same direction as the movement of the paper strip before passing down through and around the paper near the opaper outlet of the oven. The return air then passes through a heating zone before being returned to the oven.

This air flow enables any resinous or organic materials which evaporate from the paper to be carried along with the hot air stream and pass through the open burner 66 illustrated in FIG. 10 so that pollutants and contaminates tend to be incenerated before being exhausted to the atmosphere through vents 67 and 68. Small hoods 69 and 70 are placed along the upper edge of the inlet and outlet of the oven to cause any fumes exhausting to pass through vents 67 and 68.

Fans 71 and 72 circulate the air through the oven and through the hot box 73 which contains the open burners. A gas regulating valve 74 is attached to a temperature mechanism within the oven to maintain the temperature at a desired setting, usually between about 350° F. to about 450° F. depending upon the particular resin used to impregnate the paper. A typical resin impregnated paper requires a curing temperature of 400° F. at 30 seconds. The gas flow regulator moderates the flow of gas and has an off-on device inasmuch as found that off-on devices tend to cause too much temperature fluctuation within the oven and that a fairly uniform and regulated flame is required in the burner 66 to maintain an appropriate temperature in the oven.

A completed filter is shown in FIG. 11. The cylindrical porous metal screen 72 has metal end lids 73 and 74. The folded paper insert 75 forms a pleated hollow cylinder within the metal cylinder.

The technique provided by this invention involves unique steps in forming a rebuilt filter with a cured resin impregnated insert. The paper insert is formed from a flat strip of paper.

The process of forming the rebuilt filter comprises first disassembling the dirty filter. The end lids are removed by heating each end to melt the plastic, usually a plastisol residue, holding the ends to the metal cylinder. The ends are separated from the metal cylinder and the dirty paper insert discarded. The plastic is removed from the end lids by steel brushes. The metal cylinder is placed between elongated, parallel roller brushes and cleaned. It is then placed between parallel elongated rolls to remove any depressions or bumps in the side wall and to make it round again.

A strip of resin impregnated paper is conveyed to a scoring zone wherein the paper is scored, preferably on each side of the paper along the same line, perpendicularly to the travel of the paper. The scored lines of a particular size of a insert have the same spacing therebetween. The paper is then formed into open pleats while in a continuous strip and passed in a continuous manner through a high temperature zone, usually at a temperature of about 350° F. to about 450° F. for a period sufficient to cure the paper to a substantially fully cured state. Heretofore, processes for rebuilding filters cured the continuous strip of paper only partially since the fully cured paper is difficult to handle when inserting in the canister.

During curing of the paper the linear velocity of the continuous strip of pleated paper is matched to the temperature and length of the curing zone. The continuous strip of cured pleated paper is then cut into an appropriate length so that the pleated paper may be formed into a cylinder of appropriate diameter with about a 10° to 30° included angle between pleats.

The cut lengths of paper, which have a length generally two to three times the circumference of the cylindrical filter, are each passed into a tray wherein the side walls are gradually wrapped into a cylindrical chute. The canister (wire screen) is fitted over the outlet end of the chute. A length of pleated paper is passed onto the tray, through the chute and into the canister.

The lids of the canister are then filled with plastisol and placed in the canister. The lids are heated to cure the plastisol, thus forming a completed, rebuilt filter.

We claim:

1. A process for forming pleated paper cylindrical air filters of tight pleats comprising:
   (a) conveying a continuous strip of resin impregnated paper to scoring zone;
   (b) scoring said paper perpendicularly to the travel of said paper;
   (c) Pleating said paper into open pleats;
   (d) continuously curing said pleated paper of open pleats to a substantially fully cured state;
   (e) cutting said continuous strip of substantially cured pleated paper into appropriate lengths for forming into a cylinder;
   (f) compressing a length of substantially cured pleated paper into a cylinder of tight pleats and inserting said cylinder of cured pleated paper into a porous canister, wherein the pleats in said canister are tighter than said pleats during cutting of the pleated paper.

2. The process of claim 1 wherein said substantially cured paper is mechanically formed into a cylindrical shape.

3. The process of claim 1 wherein said strip of paper is conveyed to said scoring zone at a first predetermined speed and mechanically scored by scoring at a fixed interval of time and subsequently conveying said strip of paper to said scoring zone at a second predetermined speed different than first speed and mechanically scoring at said fixed interval of time to produce pleated strips wherein the widths of the pleats the paper scored at the second conveyance speeds are different than the widths of the pleats of the paper scored at the first conveyance speed.

4. The process of claim 1 wherein said open pleats have an included angle of from about 45° to about 90°.

5. The process of claim 1 wherein said tight pleats have an included angle of from about 10° to about 20°.

6. The process of claim 1 wherein the curing of said pleated paper is conducted at a temperature of about 350° F. to about 450° F.

7. The process of claim 1 wherein the resin impregnated paper is conveyed at a velocity of about 5 ft/min. to about 30 ft/min.